Aug. 3, 1937. J. E. SVEDA ET AL Re. 20,463

EDUCATIONAL TEST DEVICE

Original Filed April 1, 1935 3 Sheets-Sheet 1

INVENTORS

BY Joseph E. Sveda and Herbert G. Lehmann

Tom G. Johnson ATTORNEY

Aug. 3, 1937. J. E. SVEDA ET AL Re. 20,463
EDUCATIONAL TEST DEVICE
Original Filed April 1, 1935 3 Sheets-Sheet 2
Fig. 5
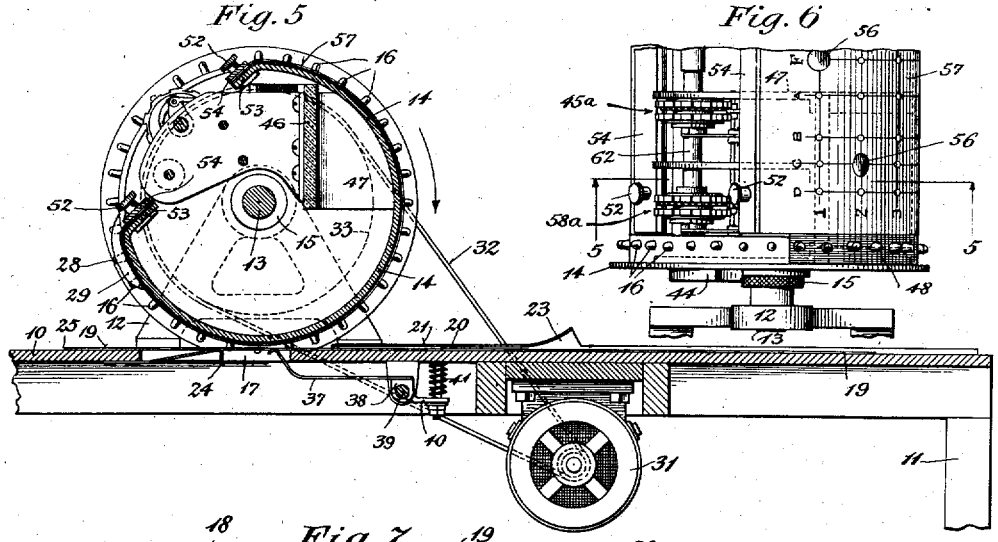
Fig. 6
Fig. 7
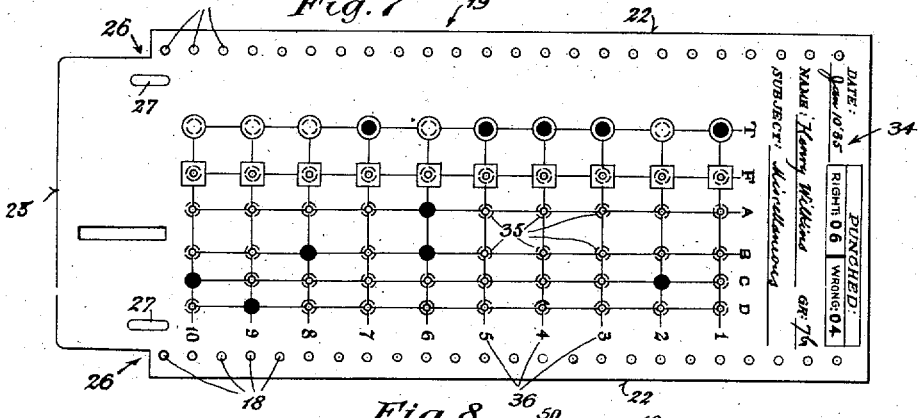
Fig. 8
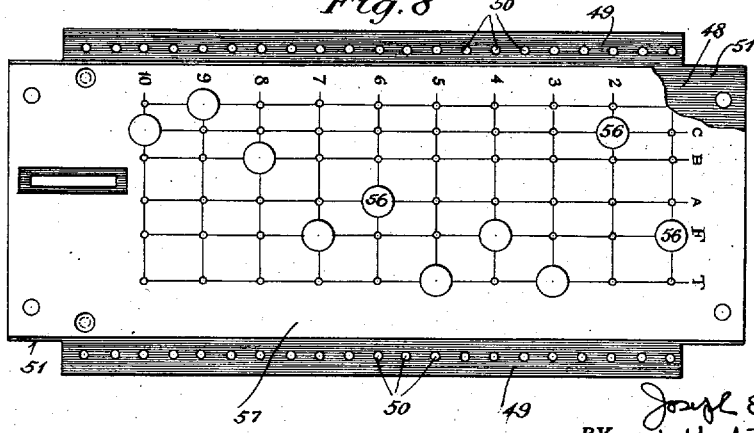
INVENTOR
Joseph E. Sveda
BY and Herbert J. Lehmann
Arthur G. Jones
ATTORNEY Aug. 3, 1937. J. E. SVEDA ET AL Re. 20,463

EDUCATIONAL TEST DEVICE

Original Filed April 1, 1935 3 Sheets-Sheet 3

INVENTOR

BY Joseph E. Sveda and Herbert B. Lehmann

Arthur G. Johnson ATTORNEY

Reissued Aug. 3, 1937

Re. 20,463

UNITED STATES PATENT OFFICE 20,463

EDUCATIONAL TEST DEVICE

Joseph E. Sveda, Wallington, N. J., and Herbert G. Lehmann, Bridgeport, Conn.

Original No. 2,048,976, dated July 28, 1936, Serial No. 14,070, April 1, 1935. Application for reissue April 14, 1937, Serial No. 136,816

40 Claims. (Cl. 35—48)

This invention relates to means for making and tallying quizzes, tests, examinations, and the like.

An object of this invention is to provide means whereby sheets, on which students and others may indicate answers to questions propounded, are automatically and in quick succession, scanned or checked one after another and the number of correct and incorrect answers indicated on the examination sheet added and imprinted on said sheet, so that the examiner, as well as the student, may know the rating of the latter.

Another object of the invention is to provide means whereby, if more than one answer is given to any question which requires but one answer, operation of the correct answer totalizer is prevented for this question, regardless of whether one of the answers given is correct, or not.

Heretofore it has been proposed many times to provide an examination sheet with designated places to be punched through by the student to indicate, for instance, his choice of alternative suggested answers or true or false answers, but in the use of these the punched holes were visually checked and mentally added by the teacher, and this required a great deal of time on the part of the teacher or his assistant.

According to this invention, it is merely necessary for the teacher to collect the test papers punched through by the student and pass them one at a time through a machine in which the test sheet is automatically scanned and the results of the scanning imprinted on the test sheet itself as the latter passes through the machine.

In the form of the invention herein disclosed, both the correct and incorrect answers are totalized, except when two answers to a single question are indicated, in which case if one be correct and the other incorrect, only the incorrect answer will be added to the "incorrect" totalizer. This is an extremely important feature of this invention for obvious reasons.

In its broader aspects, the machine of this invention may be definitely and fixedly arranged so that the correct answers will always be in the same place on the student's examination sheet, but the students would ultimately discover this sameness in the positions of the correct answer punch holes with the result that examination sheets would not indicate whether or not the students knew the correct answers to the questions propounded.

To avoid this, the present invention provides removable and replaceable key sheets for the machine with which an infinite variety of correct answer patterns may be had, thereby making it impossible for the student to know the pattern made by the correct answer punch holes. In fact, according to this invention, a key sheet may be prepared for each examination, if desired.

The machine of this invention includes means for feeding a key sheet and an examination sheet past a scanning point at which there is located a plurality of feelers, one for each prepared answer to a question.

In the form of the invention shown, these feelers are electric contacts, and the examination sheet forms an insulator between the contact fingers and a contact surface on the feeding means and a metallic key sheet carried thereby.

The metallic key sheet has apertures which align with correct answer punch-holes in the student's sheet, and when the latter is correctly punched the contact finger electrically engages the drum and closes a circuit through a solenoid actuating a "correct answer" counter. If a punched hole in the examination sheet does not align with a "correct answer" aperture in the key sheet, the contact finger engages the key sheet and closes a circuit through a solenoid which actuates an incorrect answer counter. Should there be two punch holes in a single line, one correct and one incorrect, through a relay and a slower acting solenoid for the correct answer counter, only the solenoid for the incorrect answer counter will operate.

After the examination sheet has been scanned, the totalizers which preferably have printing wheels are brought into engagement with the examination sheet to print the number of correct and incorrect answers.

The continued operation of the machine returns the totalizers to zero and then picks up and advances the next student's sheet.

Other features and advantages will hereinafter appear.

In the accompanying drawings—

Fig. 5 is a longitudinal section through the feeding drum and table, showing the contacts for operating the counting mechanism on line 5—5 of Figs. 6 and 9.

Fig. 6 is a top plan view of part of the drum and part of the frame, and showing the registering mechanism.

Fig. 7 is a plan view of the student's sheet.

Fig. 8 is a plan view of the key sheet.

Figure 1:
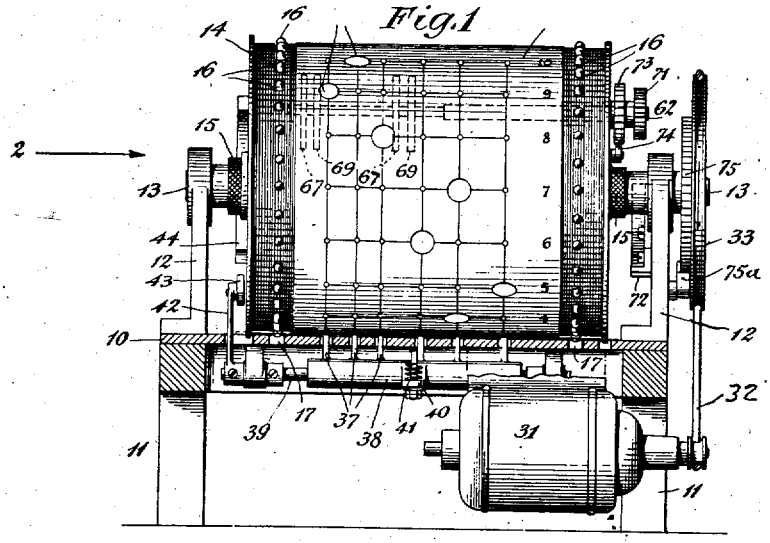
Figure 1 is an end view of the device of the present invention with part of the table shown in section to more clearly illustrate some of the parts.

As shown in the accompanying drawings, the device of the present invention comprises a table 10 mounted on legs 11 and having brackets 12 on which there is rotatably mounted a shaft 13 carrying a drum 14 which is insulated from the shaft by insulating bushings 15. The drum is so located that the table 10 is substantially tangential to the surface of the drum 10.

Around the periphery of the drum there are provided feeding pins 16 adapted to extend through slots 17 in the table, and these pins engage feeding apertures 18 in a student's sheet 19, so that when the student's sheet is inserted between the drum and the table and the drum is rotated, the pins 16 will engage the apertures 18 and advance the student's sheet 19 horizontally along the table. For the purpose of facilitating the introduction and guiding of the student's sheet, the table at the intake or receiving side is provided with lateral guides 20 having overhanging flanges 21 to engage over the lateral edges 22 of the student's sheet and hold the sheet down on the table 10. The receiving ends of the overhanging flanges 21 are bent up to provide a chute 23 to facilitate the introduction of the leading edge of the student's sheet under the flanges.

To prevent a student's sheet 19 from being engaged and advanced by the pins 16, except when a predetermined portion of the drum approaches the plane of the table, for reasons hereinafter pointed out, the table is provided with an end gage 24 normally in the path of the student's sheet and adapted to engage the leading edge 25 thereof when slid on the table toward the drum. When in this position, the pins 16 do not engage the student's sheet 19 because the lateral margins of the student's sheet in which the apertures 18 are located are cut out at the leading end of the sheet 19 as indicated at 26. When the student's sheet is against the end gage 24, a pair of auxiliary apertures 27 adjacent the leading margin of the student's sheet are located in position to be engaged by long pins 28 located on the drum in alignment with the apertures. When the drum is revolved to what may be termed "starting" position, the pins 28 enter the apertures 27 and, engaging the leading edges thereof, advance the student's sheet 19 so that pins 16 at each side of the drum may engage the first apertures 18 on the student's sheet. To permit advancement of the student's sheet at this time, the end gage 24 is depressed and rendered inoperative by a cam 29 (see Fig. 5) carried by the drum. The cam is elongated so as to hold the end gage 24 down long enough to permit the leading edge 25 of the student's sheet to be advanced beyond it so that when it is again permitted to rise it will press against the underside of the student's sheet and tend to hold it against the drum, the end stop 24 being in the form of a leaf spring as shown in the accompanying drawings.

The continued rotation of the drum 14 causes the student's sheet 19 to be advanced over the table in exact coordination with the movement of the drum so that successive portions of the student's sheet are brought into contact with the drum.

The drum may be rotated by hand by means of a handle (not shown), or by means of a motor 31 secured to the underside of the table 10 and having a belt 32 connecting the pulley on the motor with a pulley 33 on the shaft 13 of the drum.

As above stated, the device of the present invention is intended to register and record the number of correct and incorrect answers indicated on a student's sheet, such as the sheet 19, in response to true and false answer questions, or questions of the kind in which the correct one of several statements made is to be indicated.

The following is an example of these two kinds of test questions:

Q1. True or false—Trenton is the capital of New York.

Q2. A man is able to swim more easily in sea water than in fresh water, because (A) sea water is more invigorating, (B) the color of sea water is green, (C) sea water is denser, (D) sea water is colder.

In order that answers to these questions may be indicated by the student to be registered and recorded by the machine of the present invention, the present invention provides the student's sheet 19 shown in Fig. 7. This student's sheet is provided with a heading 34 having designated spaces to receive the date, the student's name, the subject, and other data desired.

Between the apertured feeding margins 22, the student's sheet has, at longitudinally spaced points, rows of circles 35 formed by indentations or perforations so that when a pointed instrument is applied to a circle, the disk defined by the circle may be pushed through, leaving a hole or aperture. The rows of weakening circles or punch holes are provided with numeral designations 36 corresponding to the number of the question propounded, there being 10 questions on the student's sheet illustrated in Fig. 7. Transversely of the student's sheet, the rows of weakening circles have suitable headings. For instance, the first row is provided with a designation "T" and indicates that if the answer to the first question for instance is true, the disk designated "1—T" will be punched through by the student. The second transverse row is provided with the designation "F", which indicates that the disks in this row are to be punched through if the student decides that the answer to a question, such as the Question 1 above given, is false. The other rows are marked "A", "B", "C" and "D", and are employed when the question is of the type of Question 2 above given, where the student must select the proper conclusion to the statement.

In connection with the above example, the student, correctly answering the questions, would punch through the disk under the column "F" in Question 1, and under the column "C" in question 2.

In Fig. 7, to avoid confusion, the holes 35 punched through are shown as black disks, and if the sheet 19 were punched through in answer to Questions 1 and 2 above given, it will be seen that Question 1 has been answered incorrectly while Question 2 has been answered correctly.

After the test, the students' sheets 19 are collected and, according to the invention, are automatically and in quick succession, rapidly scanned and marked by being passed through the present scanning and recording machine, which will register the number of correct answers and the number of incorrect answers, and will print or impress upon each student's sheet the numbers of correct and incorrect answers indicated thereon, all as the sheet is moving through the machine.

According to the invention as at present preferred, the student's sheet 19 is scanned electrically, as it moves through the machine. For this purpose, there is provided on the underside of the table 10, in the form of the invention shown herein, a plurality of spring contact fingers 37, the ends of which are located approximately at the point of tangency of the table to the drum. There is one contact 37 for each longitudinal row of punch holes 35, and the ends of the contacts 37 are made small enough to pass through the punched-out holes 35 and engage something above the surface of the student's sheet to close the electrical circuits in a manner hereinafter pointed out. All the contact fingers 37 are mounted on a rocker 38 mounted on a shaft 39 and having an arm 40 pressed downwardly by a spring 41 so as to normally urge the contact fingers upwardly toward the drum.

Figure 2:
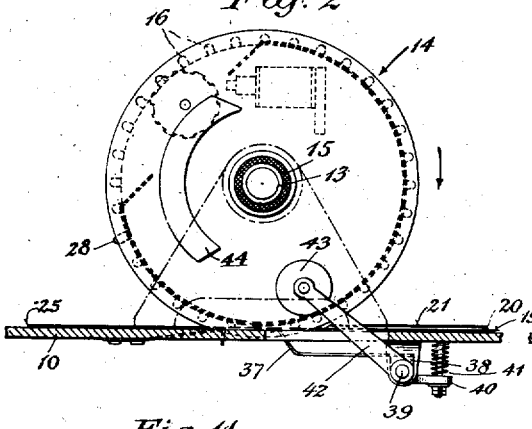
Fig. 2 is a side view of the feeding drum showing part of the table in section, the parts being shown in the positions they assume during the scanning of the student's test sheet.
Figure 3:
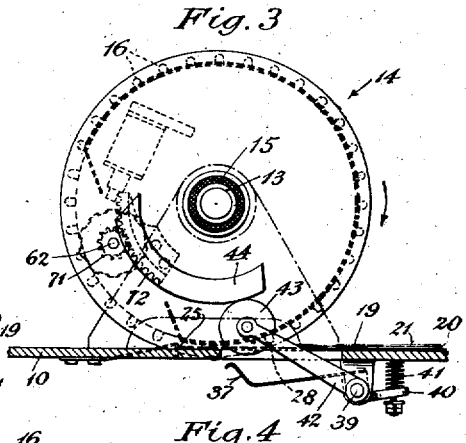
Fig. 3 is a view similar to Fig. 2, but shows the parts in the positions they assume just before the test sheet begins to feed.

Since it is only necessary to have the contact fingers urged upwardly during the time that the portion of the student's sheet from line 1 to line 10, both inclusive, passes the point of tangency of the drum with the table, and since to have them urged upwardly at any other time would cause mechanical and electrical difficulties, the shaft 39 on which the rocker 38 is secured is provided with an arm 42 having a roller 43 in position to be engaged by a cam 44 on one side of the drum so as to swing the contact fingers 37 downwardly to the position shown in Fig. 3 from that shown in Fig. 2 after the terminal lines of punch holes on the student's sheet have passed beyond the range of the contact fingers.

In the form of the invention herein disclosed, the contact fingers 37 may, when the correct hole 35 is punched through, extend upwardly through the punched hole in the student's sheet and electrically engage the feeding drum which, for this purpose, is preferably made of metal and close a circuit through a solenoid 45 mounted within the drum on a cross bar 46 secured to the sides of the drum by brackets 47. This solenoid 45 operates a counter or registering mechanism 45*a* each time it is energized.

Figure 10:
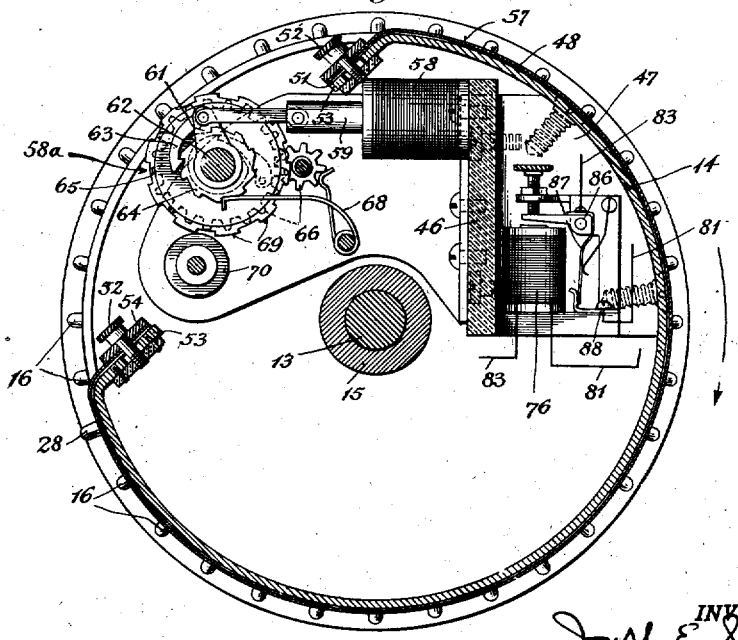
Fig. 10 is a vertical section on line 10—10, of Fig. 9.

To prevent a contact 37 from engaging the drum when the wrong hole is punched in the student's sheet, there is provided on the drum an insulating sheet 48 shown in Fig. 8. This insulating sheet has its lateral margins 49 provided with pin-engaging apertures 50 to fit over the pins 16 on the drum, and is thus held on the drum against movement relative thereto. The ends of the insulating sheet 48 have tabs 51 provided with holes to receive screws 52 carried by inwardly extending cheeks 53 on the drum which, as will be seen from Figs. 5 and 10, is open for about a quarter of its circumference. To place the insulating sheet 48 on the drum, the screws 52 with the clamping bars 54 are removed, the sheet 48 is placed around the drum on the pins 16 with apertures 55 in the tabs 51 aligning with apertures in the cheeks 53. Then the clamping bars 54 are replaced and the screws 52 adjusted to hold the clamping bar firmly against the tabs 51.

In order that the contacts 37 entering punched out holes 35 for correct answers may reach the drum, the insulating sheet 48 is provided with apertures 56. These apertures are placed in the insulating sheet by the instructor according to a predetermined plan depending upon the correct answers to the questions, and the instructor may prepare the key sheet 48 in advance and then arrange the questions accordingly, or the questions may be arranged and then the key sheet punched out, or apertured, according to which answers to the respective questions are the correct ones.

To facilitate this, the key sheet is ruled off to provide longitudinal and transverse lines, the transverse lines being provided with numerals corresponding with the number of questions and the horizontal lines being designated like the rows of weakened circles 35 in the student's sheet 19. Thus, considering the two questions above given, in preparing the key sheet the instructor punches out the aperture 56 on line 1 under the heading "F", for the statement in the first question is false. On the second line, the instructor punches out the aperture 56 under the heading "C", for the part "C" of the statement of the test is correct.

It will be noted that the designations "T", "F", "A", "B", "C", and "D" are in inverted order laterally of the sheet 48, and this is because the sheet 48 is wrapped around the drum and comes face to face with the student's sheet 19 when the drum is rotated, and it should also be noted that the student's sheet 19 approaches the drum foot first, and that the lines are scanned in inverse order. This is done so that the totals may be printed at the heading of the student's sheet.

If the key sheet 48 merely permitted the contacts 37 to extend through the holes for the correct answers, only the number of correct answers could be registered, and hence, if the student punched through all the holes 35 in the student's sheet, the machine would register and record ten correct answers, in spite of the fact that each of the answers would be wrong because more than one answer was given to each question.

To avoid this, the present invention not only registers and records the correct answers, but also does so with respect to the incorrect answers.

For this purpose, the key sheet 48 is provided with a thin metal strip 57 secured to it in any suitable manner as by pasting or cementing the metal sheet 57 to the key sheet 48. The metal or conducting portion 57 of the key sheet is connected through the clamping bar to a solenoid 58 carried within the drum on the cross bar 46 and operating the registering and recording mechanism 58*a* for counting the incorrect answers. Hence, when a contact 37 enters a punched hole 35 in the student's sheet which designates an incorrect answer, it does not reach the drum but is intercepted by the key sheet 48 and makes electrical contact with the metal portion 57 thereof to close the circuit through the solenoid 58 for the incorrect answer register 58*a*.

However, when the contact extends through a "correct" punched hole 35 in the student's sheet, it passes thru the hole 56 in the insulating and conducting portions of the key sheet 48, engages the drum 14, and closes the circuit leading to the solenoid 45 for the correct answer register 45a, the holes 56 being, as shown, punched through the insulating as well as the conducting portions of the key sheet, and the hole 56, being substantially larger than the punched hole 35, the contact 37 passing through the hole 35 does not engage the margin of the hole 56.

While the correct answer pattern of the key sheet 48 may be the same for a number of different examinations held at the same time, it is preferable that a number of different key sheets be employed so that the students will not become familiar with the pattern formed by the correct answer punched holes and thus defeat the purpose of the examination.

Accordingly, the key sheet 48 is removably supported on the drum so that it may be changed from time to time and different patterns of correct answers be employed.

By the present invention the totals of correct and incorrect answers of the registers are printed on the student sheet as the latter moves through the machine, and after the scanning of the sheet has been completed.

The registering and recording mechanisms 45a and 58a for the correct and incorrect answers are the same, and, therefore, the description as to one of them will suffice for the other.

Figure 9:
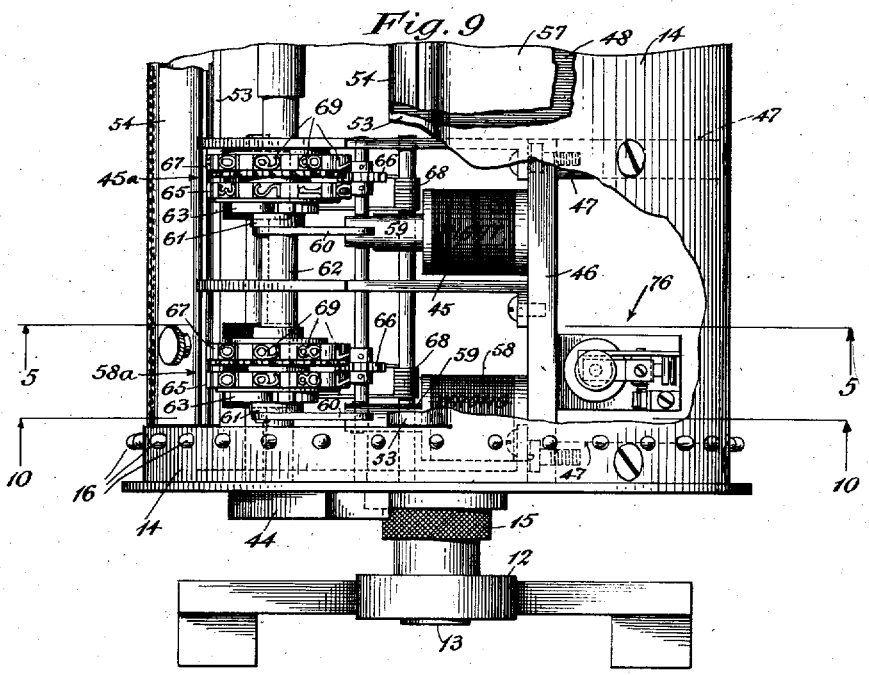
Fig. 9 is a top view partly broken away of one end of the drum, on an enlarged scale, showing the counting and registering device.

The armature 59 for each solenoid is connected by a link 60 to a ratchet arm 61 pivotally mounted on a shaft 62 so that when the ratchet arm is vibrated a pawl 63 carried thereby will engage a ratchet 64 connected to the units wheel 65 of the register, (see Figs. 9 and 10). When the units wheel 65 completes one revolution, through a carry-over mechanism diagrammatically illustrated at 66, the tens wheel 67 is operated one step, the wheels being held in adjusted position by detents 68. On the surface of the wheels 65 and 67 there is provided raised numerals 69 constituting types and rolling in contact with these numerals in an inking roller 70 supplying ink to the raised numerals 69.

The numeral wheels 65 and 67 are so mounted within the outlines of the drum that at the end of the scanning operation during which the register is operated, the raised numerals 69 will be brought into contact with the student's sheet so as to print the number recorded on the registers. As shown in Fig. 7, the numeral "6" has been printed after the word "right", and the numeral "4" has been printed after the word "wrong". It will be noted that the printing wheels are so disposed on the drum laterally thereof that the printing takes place between the rows of apertures, the student's sheet being supported by the portions of the table between the slots through which the contact fingers 37 extend.

Thus it will be seen that the present invention has provided a machine for scoring a student sheet and for printing said scores on the sheet, all as the latter is being automatically passed with a continuous movement through said machine.

After printing the results of the counting on the student's sheet, the registers are returned to zero preparatory to the scanning of the next student's sheet. This is done by suitable zero-setting mechanism including notches provided in the shaft 62 and pawls carried by the register wheels 65 and 67, so that when the shaft is rotated in a clockwise direction as viewed in Fig. 10, all of the counter wheels will be picked up and brought to a definite predetermined position, i. e., zero position. Any suitable zero-setting mechanism may be employed.

Figure 4:
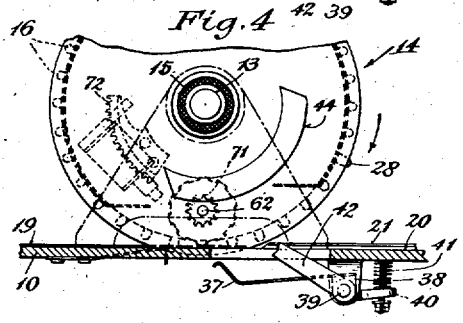
Fig. 4 is a similar view, showing the parts in the positions they assume during the printing of the totals on the test sheet.

For doing this automatically, the shaft 62 is extended through the casing at one side where it is provided with a gear 71 in position to engage a rack 72 carried by the adjacent support 12. In Fig. 4, the dial wheels or counters 65 and 67 are in position to print the totals on the student's sheet. Upon further movement of the drum, the dials are carried out of contact with the student's sheet and the zero-setting gear 71 engages the rack 72 and this continues until the shaft has been given the necessary amount of rotation to bring all of the counters to zero position. During the time that the portion of the drum containing the register mechanism is adjacent the table, the contact fingers 37 are held depressed as shown in Fig. 4, and they remain depressed until the student's sheet is picked up and advanced. In returning the counters to zero, both the units and the tens wheel is rotated, and thus it is assured that all of the printing surfaces, that is to say, all of the numerals on the counters, will be coated with ink and ready to print.

The zero-setting mechanism is provided with a ratchet 73 and a back check pawl 74 to prevent it from rotating in reverse direction, and, likewise, the shaft 13 is provided with a ratchet wheel 75 engaged by a back-check pawl 75a.

If a student punches through more than one punch hole 35 at one line, as shown on line 6 in Fig. 7, and one of them is the correct one, the answer would not be entitled to be marked "correct", because the questions are so arranged that there can be only one "right" answer. Unless means are provided to prevent it, the machine would register under such conditions one right and one wrong answer, and if each question were answered, the total shown on the dials 65 and 67 would be greater than the number of questions asked, and the true rating of the student's sheet would be impossible.

To avoid this simultaneous operation of the correct and incorrect counters, the present invention provides means under the control of the circuits energized by a contact 37 extending through an incorrect punched hole 35 for rendering the solenoid 45 for the correct answer counter inoperative. This is done in the embodiment of this invention illustrated herein by providing a contactor or cut-out 76 in series with the "wrong" counter solenoid 58 and making the solenoid 45 for the "right" counter slow-acting. With this provision, if the circuits for the "right" and "wrong" solenoids are energized together, before the "right" solenoid 45 begins to act the cut-out 76 will operate to open the circuit to the solenoid 45 and the latter will not operate.

Of course, any suitable electrical connections may be made between the various parts of the device. However, the arrangement at present preferred is diagrammatically illustrated in Fig. 11. As shown, the contact fingers 37 are connected by a wire 77 to a source of current 78, and this is connected by a wire 79 so that current flows to the shaft 13 from which the drum 14 is insulated. The "wrong" solenoid 58 has one side connected by a wire 80 to the metal portion 57 of the key sheet 48, while its other side is connected by a wire 81 to the winding 82 of the cut-out or contactor 76. The other side of the latter is connected by a wire 83 to the shaft 13.

The "right" solenoid 45 is connected at one side by a wire 84 to the drum 14, while at the other side it has a wire 85 leading to a contact point 86 normally engaged by a circuit closer 87 which also engages a contact point 88 connected to the wire 83 which leads to the drum shaft 13. The circuit closer has an armature 89 which, when the electromagnet 76 is energized, opens the circuit leading to the "right" solenoid.

Thus, when a contact finger 37 engages through a punch hole 36 aligned with an aperture 56 in the key sheet 48, current will flow from the drum through the wire 84, solenoid 45, contact 86, circuit closer 87, contact 88, wire 83, shaft 13, wire 79, back to the battery 78, provided no other contact finger at the same time engages the metal portion 57 of the key sheet. If this latter should occur, however, current will flow as above stated through the "right" solenoid but will also flow from the metal portion 57 of the key sheet, wire 80, "wrong" solenoid 58, contactor 76, wire 83, to the shaft 13 and back to the battery. The "right" solenoid 45 is slower acting than the "wrong" solenoid 58, and, accordingly, when the electromagnet 76 is energized, the circuit including the contacts 86 and 88 and the "right" solenoid 45 is opened, and only the "wrong" solenoid 58 acts to advance its associated counting dials one step.

It should be understood, of course, that the solenoid 45, even though slow-acting, is for all practical purposes instantaneous in its operation, and that both solenoids are designed to operate during the closing of the circuits leading to them respectively, regardless of ordinary variations in the speed at which the drum is rotated.

Figure 11:
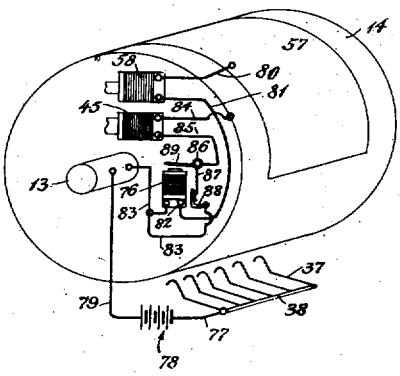
Fig. 11 is a diagram showing the electrical connections between the various parts.

As shown in Figs. 10 and 11, the cut-out 76 is mounted within the drum 14. Since the counters are also mounted in the drum, only a single electrical connection between the drum and the table (and that through the shaft) is needed in addition to the contacts 37 to operate the electromagnets and cut-out.

As will be observed from Fig. 7, the counters are arranged to print between the longitudinal rows or punch holes 35, and thus, in the printing operation, the student's sheet is supported directly under the printing wheels by the portion of the table remaining between the slots through which the contacts 37 extend.

The end stop 24 is also located between the longitudinal rows of holes 35 so as not to interfere with the advancement of the student's sheet.

Variations and modifications may be made within the scope of the claims.

We claim:

1. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; a correct answer counter; and means actuated by feelers when the latter enter correct answer punch-holes for operating said correct answer counter.

2. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; an incorrect answer counter; and means actuated by feelers when the latter enter incorrect answer punch-holes for operating said incorrect answer counter.

3. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; a correct answer counter; means actuated by feelers when the latter enter correct answer punch-holes for operating said correct answer counter; an incorrect answer counter; and means actuated by feelers when the latter enter incorrect answer punch-holes for operating the incorrect answer counter.

4. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; a correct answer counter; means actuated by feelers when the latter enter correct answer punch-holes for operating said correct answer counter; an incorrect answer counter; means actuated by feelers when the latter enter incorrect answer punch-holes for operating the incorrect answer counter; and means actuated by a feeler entering an incorrect answer punch-hole for preventing operation of the correct answer counter by another feeler simultaneously entering a correct answer punch-hole.

5. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; a backing member for said examination sheet; a correct answer counter; and means actuated by a feeler entering a correct answer punch-hole and engaging said backing member for operating said correct answer counter.

6. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; a member lying adjacent said examination sheet as it is traversed by said feelers and having apertures aligning with correct answer punch-holes; an incorrect answer counter; and means actuated by feelers entering incorrect answer punch-holes and engaging said member for operating said incorrect answer counter.

7. A machine for scanning and totalizing examination sheets having punched holes indicating a student's choice of answers, comprising; a row of feelers; feeding means for causing said row of feelers to traverse a punched examination sheet over answer punch-holes, whether correct or incorrect; a backing member for said examination sheet; a correct answer counter; means actuated by feelers entering correct answer punch-holes and engaging said backing member for operating said correct answer counter; a member interposed between said backing member and said examination sheet and having apertures aligning with correct answer punch-holes; an incorrect answer counter; and means actuated by feelers entering incorrect answer punch-holes and engaging said interposed member for operating said incorrect answer counter.

8. The invention as defined in claim 3, in which the means actuated by feelers entering correct answer punch-holes includes an electric circuit closed by a feeler entering a correct answer punch-hole, an electromagnet energized in said circuit, and a pawl and ratchet mechanism operated by the electromagnet and operating said correct answer counter, and in which the means actuated by feelers entering incorrect answer punch-holes includes an electric circuit closed by a feeler entering an incorrect answer punch-hole, an electromagnet energized in said circuit, and a pawl and ratchet mechanism operated by the electromagnet and operating said incorrect answer counter.

9. The invention as defined in claim 4, in which the means actuated by feelers entering correct answer punch-holes includes an electric circuit closed by a feeler entering a correct answer punch-hole, an electromagnet energized in said circuit, and a pawl and ratchet mechanism operated by the electromagnet and operating said correct answer counter, and in which the means actuated by feelers entering incorrect answer punch-holes includes an electric circuit closed by a feeler entering an incorrect answer punch-hole, an electromagnet energized in said circuit, and a pawl and ratchet mechanism operated by the electromagnet and operating said incorrect answer counter; and also in which the electromagnet for the correct answer counter is slow-acting and in which the means for preventing concurrent operation of the two counters includes a relay provided to open the circuit leading to the electromagnet for the correct answer counter.

10. The invention as defined in claim 7, in which the feelers are electrical contacts, and in which the means for operating the correct answer counter includes an electrical circuit connected to said backing member, an electromagnet energized in said circuit, and a pawl and ratchet mechanism operated by said electromagnet and operating said correct answer counter, and also in which the means for actuating said incorrect answer counter includes an electric circuit connected to said interposed member, an electromagnet energized in said circuit, and a pawl and ratchet mechanism operated by said electromagnet and operating said incorrect answer counter.

11. A machine for scanning and totalizing examination sheets having punched holes indicating a student's choice of answers and having marginal pin-engaging feeding apertures, comprising; a table; a drum having pins thereon to engage the feeding apertures in the student's sheet to move the latter past a point of operation on the table; a row of feelers mounted on the table to engage the examination sheet as it is advanced by said drum, said feelers being adapted to enter holes punched in the examination sheet by the student; a counter mounted on the drum; and means including an electric circuit closed as a result of a feeler passing through a punched hole in the student's sheet for operating said counter.

12. A machine for scanning and totalizing examination sheets having punched holes indicating a student's choice of answers and having marginal pin-engaging feeding apertures, comprising; a table; a drum having pins thereon to engage the feeding apertures in the student's sheet to move the latter past a point of operation on the table; a row of feelers mounted on the table to engage the examination sheet as it is advanced by said drum, said feelers being adapted to enter holes punched in the examination sheet by the student; a counter mounted on the drum; a key sheet carried by the drum to be interposed between the surface of the drum and the examination sheet; and means including an electric circuit closed by one of said feelers contacting said key sheet through a punched hole in the examination sheet for actuating said counter.

13. In a machine for scanning and totalizing examination sheets having designations thereon indicating a student's choice of answers and having marginal pin-engaging feeding apertures; a table; a drum having pins thereon to engage the feeding apertures in the student's sheet to move the latter past a point of operation on the table; means for normally holding the leading edge of an examination sheet being brought into contact with said feeding pins on the drum; and means carried by the drum for rendering the last-named means inoperative and moving the examination sheet in position to be engaged by said feeding pins.

14. In a machine for scanning and totalizing examination sheets having designations thereon indicating a student's choice of answers and having marginal pin-engaging feeding apertures; a table; a drum having pins thereon to engage the feeding apertures in the student's sheet to move the latter past a point of operation on the table; means for normally holding the leading edge of an examination sheet being brought into contact with said feeding pins on the drum; and means carried by the drum for rendering the last-named means inoperative to permit the advancement of the student's sheet at a predetermined point in the rotation of the drum.

15. A machine for scanning and totalizing examination sheets having punched holes indicating a student's choice of answers, comprising; a counter; means to actuate said counter including means traversing the punched examination sheet and engaging holes punched in the examination sheet; and means for printing the totals accumulated in said counter on the examination sheet while it is still being traversed, and after said examination sheet has been scanned.

16. A machine for scanning and totalizing examination sheets having punched holes indicating a student's choice of answers, comprising; a counter; means to actuate said counter including means traversing the punched examination sheet and engaging holes punched in the examination sheet; means for printing the totals accumulated in said counter on the examination sheet while it is still being traversed and after said examination sheet has been scanned; and means for automatically returning said counter to zero position after the total is printed on the examination sheet being scanned and before the scanning of the next examination sheet begins.

17. A machine for scanning and totalizing examination sheets having punched holes indicating a student's choice of answers, comprising; a correct answer counter; an incorrect answer counter; means to actuate said counters including means traversing the punched examination sheet and engaging holes punched in the examination sheet; and means for printing the totals accumulated in said counters on the examination sheet while it is still being traversed, and after the examination sheet has been scanned.

18. A machine for scanning and totalizing examination sheets having punched holes indicating a student's choice of answers, comprising; a set of feelers; feeding means for causing said set of feelers to traverse a punched examination sheet over answer punch-holes, whether correct or incorrect; a backing member for said examination sheet; a member interposed between said backing member and said examination sheet and having apertures aligning with those of a correctly answered and punched examination sheet; a correct answer counter; and means actuated by feelers entering correct answer punch-holes and engaging said backing member through apertures in said interposed member for operating said correct answer counter.

19. A machine for scanning and totalizing examination sheets having punched holes indicating a student's choice of answers, comprising; a set of feelers; feeding means for causing said set of feelers to traverse a punched examination sheet over answer punch-holes, whether correct or incorrect; a correct answer counter; means actuated by feelers when the latter enter correct answer punch-holes for operating said correct answer counter; and means actuated by a feeler when the latter enters an incorrect answer punch-hole for preventing operation of the correct answer counter by another feeler simultaneously entering a correct answer punch-hole.

20. A machine for scanning and totalizing examination sheets having punched holes indicating a student's choice of answers, comprising; a set of feelers; feeding means for causing said set of feelers to traverse the punched examination sheet over answer punch-holes, whether correct or incorrect; a backing member for said examination sheet; a member interposed between said backing member and said examination sheet and having apertures aligning with those of a correctly answered and punched examination sheet; an answer integrator; and means actuated by said feelers entering both correct and incorrect answer punch holes and acting on said backing member and interposed member for operating said answer integrator.

21. A machine for scanning and totalizing examination sheets having punched holes indicating a student's choice of answers, comprising; a set of feelers; means for causing the examination sheet to travel relative to said feelers; a counter; means for actuating said counter; and means for printing the total accumulated in said counter on the examination sheet during the movement of said sheet, after it has been scanned.

22. A machine for grading and marking examination sheets passed therethrough, said sheets having punched holes indicating a student's choice of answers, comprising a counter; means, including a scanning means traversed by the sheet in its movement and actuated by the holes in said sheet, for advancing the counter in response to movement of the punched holes of the sheet past the scanning means; means for feeding the sheet through the machine past said scanning means; and printing means automatically periodically operative with said feeding means for impressing the totals accumulated in the counter on said sheet.

23. A machine for grading and marking examination sheets passed therethrough, said sheets having punched holes indicating a student's choice of answers, comprising a counter; means, including a scanning means traversed by the sheet in its movement and actuated by engagement with the holes in said sheet, for advancing the counter in response to movement of the punched holes of the sheet past the scanning means; means for feeding the sheet through the machine past said scanning means; printing means automatically periodically operative with said feeding means for impressing the totals accumulated in the counter on said sheet; and means automatically periodically operative with said feeding means for returning the counter to zero position after the total is printed on the examination sheet.

24. A machine for grading and marking examination sheets passed therethrough, said sheet having punched holes indicating a student's choice of answers, comprising a correct answer counter; an incorrect answer counter; means including a scanning means traversed by the sheet in its movement and actuated by engagement with the holes in said sheet, for advancing the counters in response to movement of the punched holes of the sheet past the scanning means; means for feeding the sheet through the machine past said scanning means; and printing means automatically periodically operative with said feeding means for impressing the totals accumulated in the counter on said sheet.

25. The invention as defined in claim 22, in which the means for feeding the sheet includes a drum engaging said sheet.

26. A machine for scanning and totalizing examination sheets having punched holes indicating a student's choice of answers, comprising a row of feelers; feeding means for causing said row of feelers to traverse a punched examination sheet over answer punch-holes, whether correct or incorrect, said means including a backing member for said examination sheet; a correct answer counter; and means actuated by a feeler entering a correct answer punch-hole and engaging said backing member for operating said correct answer counter.

27. A machine for scanning and totalizing examination sheets having punched holes indicating a student's choice of answers, comprising a row of feelers; feeding means for causing said row of feelers to traverse a punched examination sheet over answer punch-holes, whether correct or incorrect; a cylinder engaging the examination sheet during traversing of the feelers over the sheet; a correct answer counter; and means actuated by a feeler entering a correct answer punch-hole and engaging said cylinder for operating said correct answer counter.

28. A machine for scanning and totalizing examination sheets having punched holes indicating a student's choice of answers, comprising a row of feelers; feeding means for causing said row of feelers to traverse a punched examination sheet over answer punch-holes, whether correct or incorrect; a backing member for the examination sheet having a surface substantially equal to the total punch-hole area of said sheet; a correct answer counter; and means actuated by a feeler entering a correct answer punch-hole and engaging said backing member for operating said correct answer counter.

29. A test scoring machine for examination sheets having designations selectively placed thereon and according to the position placed representing answers to questions, comprising a base; feeding means for moving an examination sheet relatively to the base past a given point; sheet scanning means carried by the base, responding to the designations on said sheets; an accumulator; and means for operating said accumulator from the responses of the sheet scanning means to correct answer designations, to total the score of answers on the sheet.

30. A test scoring machine for examination sheets having designations selectively placed thereon and according to the position placed representing answers to questions, comprising a base; feeding means for moving an examination sheet relatively to the base past a given point; sheet scanning means carried by the base, responding to the designations on said sheets; an accumulator; means for operating said accumulator from the responses of the sheet scanning means to correct answer designations, to total the score of answers on the sheet; and means controlled by said accumulator for printing the score totaled thereon on the sheet as it is fed through the machine.

31. A test scoring machine for examination sheets having designations selectively placed thereon and according to the position placed representing answers to questions, comprising a base; feeding means for moving an examination sheet relatively to the base past a given point; sheet scanning means carried by the base, responding to the designations on said sheets; an accumulator; means for operating said accumulator from the responses of the sheet scanning means to correct answer designations, to total the score of answers on the sheets; means controlled by said accumulator for printing the score total thereon on the sheet as it is fed through the machine; and means for automatically returning said printing means to zero position after the score is printed on the examination sheet being scanned, and before the scanning of the next examination sheet begins.

32. A test scoring machine for examination sheets having designations selectively placed thereon and according to the position placed representing correct and incorrect answers to questions, comprising a correct-answer accumulator; means for operating said accumulator according to the correct-answer designations on said sheets, including sheet scanning means responding to said designations; means for feeding sheets relatively to the scanning means; and means for preventing operation of said accumulator when designations representing both a correct answer and an incorrect answer to any one question are scanned by the scanning means.

33. A test scoring machine for examination sheets having designations selectively placed thereon and according to the position placed representing correct and incorrect answers to questions, comprising a correct-answer accumulator; an incorrect-answer accumulator; means for operating said accumulators selectively according to the correct-answer and incorrect-answer designations on the sheets, including sheet scanning means responding to said designations; means for feeding the sheets relatively to the scanning means; and means for preventing operation of the correct-answer accumulator when designations, representing both an incorrect answer and a correct answer to any one question, are scanned by the scanning means.

34. A test scoring machine for examination sheets having designations selectively placed thereon and according to the position placed representing correct and incorrect answers to questions, comprising a correct-answer accumulator; an incorrect-answer accumulator; means for operating said accumulators selectively according to the correct-answer and incorrect-answer designations on the sheets, including sheet scanning means responding to said designations; means for feeding the sheets relatively to the scanning means; means for preventing operation of the correct-answer accumulator when designations, representing both an incorrect answer and a correct answer to any one question, are scanned by the scanning means; and means controlled by said accumulators for printing the score totaled thereon on the sheet as it is fed through the machine.

35. A test scoring machine for examination sheets having designations selectively placed thereon and according to the position placed representing correct and incorrect answers to questions, comprising a score-totalizing device; means for operating said device selectively according to the correct-answer and incorrect-answer designations on the sheets, including sheet scanning means responding to said designations; means for feeding the sheets relatively to the scanning means; and means for preventing correct-answer operation of the device when an incorrect-answer designation is scanned by the scanning means.

36. A machine for scoring examination sheets passed therethrough having designations selectively placed thereon and according to the position placed representing answers to questions, and for printing the scores of said sheets thereon, comprising a base; feeding means for moving a sheet relatively to the base, including a drum rotatably mounted on the base and adapted to engage the sheet; an accumulator carried by the drum; means for operating said accumulator according to the designations on said sheets; and means carried by the drum for printing the scores totaled on the accumulator, on the examination sheet during the movement of the sheet.

37. A machine for scoring examination sheets passed therethrough having designations selectively placed thereon and according to the position placed representing answers to questions, and for printing the scores of said sheets thereon, comprising an accumulator; means for operating said accumulator, including sheet scanning means responding to said designations; feeding means for moving a sheet past said scanning means, said feeding means including a drum rotatably mounted relatively to the scanning means, said drum carrying said accumulator; and means controlled by the accumulator for printing the scores totaled thereon on the examination sheet during the movement of said sheet past the scanning means.

38. In a test scoring machine through which examination sheets are passed having designations selectively placed thereon and according to the position placed representing answers to questions, a cylindrical member adapted to turn with advancement of the sheets; a master pattern carried by said member and arranged to correspond to the designations of a correctly answered examination sheet; and means on said member for engaging an examination sheet to position successive portions of the latter properly relatively to said pattern as the member turns and the sheet advances through the machine.

39. The invention as defined in claim 38, in which the pattern comprises a removable sheet secured to the cylindrical member in predetermined relation to the means for engaging the examination sheets.

40. The invention as defined in claim 38, in which the pattern comprises a removable sheet secured to the cylindrical member in predetermined relation to the means for engaging the examination sheet, said removable sheet being positioned on the member by said means.

JOSEPH E. SVEDA.
HERBERT G. LEHMANN.